July 18, 1967  J. TRIFILETTI ET AL  3,331,478
ELECTRICAL BRAKE-CONTROLLED THROTTLE CUT-OUT SYSTEM
Filed May 21, 1965
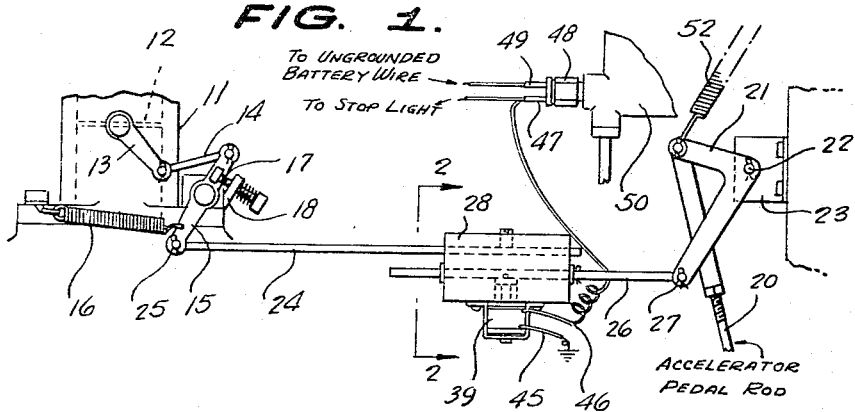
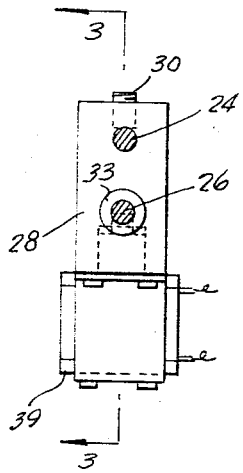
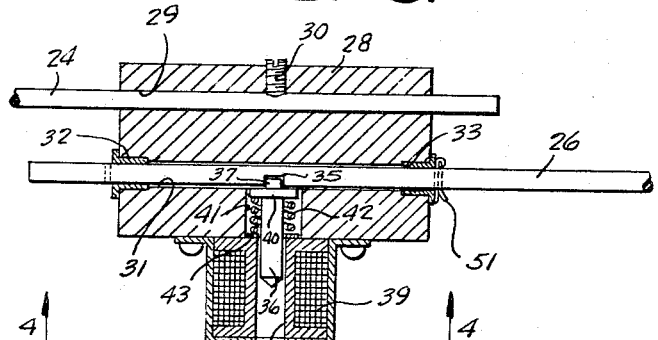
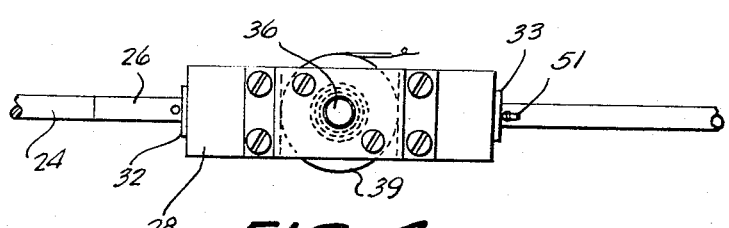
INVENTORS
JOSEPH TRIFILETTI,
THOMAS TRIFILETTI,
BY
Berman, Davidson & Berman
ATTORNEYS.

United States Patent Office 3,331,478
Patented July 18, 1967

3,331,478
ELECTRICAL BRAKE-CONTROLLED THROTTLE CUT-OUT SYSTEM
Joseph Trifiletti, 25 Birch Tree Road, Albany, N.Y. 12205, and Thomas Trifiletti, 9 North St., West Albany, N.Y. 12204
Filed May 21, 1965, Ser. No. 457,693
4 Claims. (Cl. 192—3)

This invention relates to safety devices for motor vehicles, and more particularly to means for automatically cutting off the fuel supply to the engine of a motor vehicle when the brakes of the vehicle are actuated.

A main object of the invention is to provide a novel and improved safety system for automatically cutting off the fuel supply to the engine of a motor vehicle when the brake pedal of the vehicle is depressed, thus applying the brakes, thereby preventing accidental acceleration of the vehicle at this time, and providing safer stops, minimizing wear of brake parts, preventing the vehicle engine from being unnecessarily loaded, improving gas mileage, and greatly reducing the risk of accidents, the improved system employing relatively simple, inexpensive and compact parts which are easy to install, which do not require revision of existing structure of a motor vehicle, and are easy to adjust.

A further object of the invention is to provide an improved safety apparatus for a motor vehicle for automatically causing the throttle of a motor vehicle to be moved to cut-off position responsive to the actuation of the associated vehicle brakes, the system being reliable in operation, requiring a minimum amount of maintenance, and operating concurrently with the closure of the vehicle stop-light switch.

A still further object of the invention is to provide an improved safety apparatus for a motor vehicle which automatically disconnects the accelerator linkage from the vehicle engine throttle valve responsive to the application of the vehicle brakes, allowing the throttle valve to be moved to its substantially closed position by the action of its spring-biasing means, the apparatus being operated concurrently with the closure of the motor vehicle stop-light switch, and being electrically-controlled, whereby it requires only a few parts, is inexpensive to manufacture, and is not subject to any substantial amount of mechanical wear.

Further objects and advantages of the invention will become apparent from the following description and claims, and from the accompanying drawings, wherein:

FIGURE 1 is a side elevational view of an improved safety system according to the present invention, shown installed on a motor vehicle and showing the associated parts of the vehicle with which the safety apparatus is related.

FIGURE 2 is an enlarged transverse vertical cross-sectional view taken substantially on the line 2—2 of FIGURE 1.

FIGURE 3 is a longitudinal vertical cross-sectional view taken substantially on the line 3—3 of FIGURE 2 through the link rod connecting block of the apparatus.

FIGURE 4 is a bottom plan view of the connecting block and adjacent parts of the associated link rod elements, said view being taken on the line 4—4 of FIGURE 3.

Referring to the drawings, 11 designates the conventional carburetor of a motor vehicle, the carburetor being provided with a throttle flap valve 12 which is operated by an arm 13 connected by a link rod 14 to a pivoted lever 15 which is biased in a clockwise direction by a coiled spring 16, as shown in FIGURE 1, toward engagement with the end of an adjustable stop screw 17 mounted on a lug 18 forming part of the carburetor assembly, the spring 16 acting to bias the throttle valve element 12 toward a substantially closed, or idling position, determined by the adjustment of the stop screw 17. Normally, the flap valve 12 is rotated toward opening position, namely, in a counterclockwise direction, as viewed in FIGURE 1, by being connected to a linkage operated by the accelerator pedal of the motor vehicle, and including an accelerator pedal rod 20 connected to a bell-crank lever 21 pivoted at 22 to a fixed portion of the vehicle frame, for example, to a bracket 23. The accelerator rod 20 is connected to one arm of the bell crank 21, and normally, the other arm of the bell crank 21 is connected to the lower arm of the lever 15.

In accordance with the present invention, the normal connection rod between bell crank 21 and lever 15 is replaced by a substitute connecting rod assembly comprising a first rod 24 connected at 25 to the lower arm of lever 15, a second rod element 26 connected at 27 to the lower arm of the bell-crank lever 21, and a connecting block 28. The rod element 24 is received in a longitudinal bore 29 provided in the upper portion of the block 28 and is fixedly secured to the block by a set screw 30 threadedly engaged in the upper portion of block 28 and clampingly engaged with the rod 24, as is clearly shown in FIGURE 3. The remaining rod element 26 is slidably received in a bottom longitudinal bore 31 provided in block 28, extending parallel to the bore 29, and provided with respective wear bushings 32 and 33 at its opposite ends which serve as the sliding supports for the rod element 26. Rod element 26 is formed with a notch 35 which receives the top end of a locking plunger 36, said top end being shown at 37 in FIGURE 3. The plunger 36 is of magnetic material and extends into the central bore of the core 38 of a solenoid 39 secured to the block 28, the plunger 36 being provided with a top flange 40 which is received in an enlarged bore 41 provided in the block 28 and which is urged toward the rod 26 by a coiled spring 42 surrounding plunger 36 and bearing between the flange 40 and a washer 43 seated against the adjacent end of the solenoid core 38.

Under normal conditions, the rod element 24 is connected to the rod element 26 by engagement of the lug element 37 in the notch 35. Thus, under said normal conditions, when the bell-crank lever 21 is rotated counterclockwise, as viewed in FIGURE 1, by the depression of the accelerator rod, the lever 15 is also caused to rotate counterclockwise, thereby opening the butterfly valve element 12.

As shown in FIGURE 1, solenoid 39 has one of its terminals grounded, and shown at 45, the other terminal 46 being connected to the same terminal 47 of the vehicle stop-light switch 48 as is connected to the ungrounded terminal of the stop-light lamp. The remaining terminal of the switch 48, shown at 49, is connected to the ungrounded battery wire. The stop-light switch 48 is operated by the hydraulic braking pressure developed in the vehicle master cylinder 50, in a manner well-known to those skilled in the art, so that the switch 48 closes when the vehicle brakes are applied. Under these conditions, the solenoid 38 becomes energized simultaneously with the vehicle stop light. The energization of the solenoid 39 retracts the plunger element 36, disengaging the projection 37 from the notch 35, and thus effectively disconnecting the rod element 26 from rod element 24. Since block 28 can no longer transmit tension from rod element 26 to rod element 24, lever 15 is free to be rotated in a clockwise direction by the action of its biasing spring 16 so as to move into engagement with the stop screw 17, thus causing the buterfly valve 12 to be rotated to its substantially closed or idling position. Therefore, when the brake pedal is actuated sufficiently to cause the stop-light switch 48 to close, the accelerator linkage is automatically disconnected, and it is not possible to accelerate the vehicle under these conditions.

The location of the rod element 24 relative to the block 28 is easily adjustable, since it can be shifted by loosening the set screw 30, and can be again locked in proper position relative to block 28 by tightening said set screw.

A cotter pin 51 may be provided in the rod element 26, as shown in FIGURE 3, the cotter pin being located adjacent the bushing 33 and being engageable thereagainst under the biasing action of the accelerator linkage spring 52. Thus, when the lug 37 is disengaged from the notch 35, the cotter pin 51 may be engaged against the bushing 33 to urge block 28 to the left, as viewed in FIGURE 1, namely, in the same direction as the throttle valve-biasing spring 16.

While a specific embodiment of an improved motor vehicle safety system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a motor vehicle provided with a brake stop-light switch and a stop-light energizing wire connected to one terminal of said stop-light switch, the other terminal of the switch being connected to the ungrounded terminal of the motor vehicle battery, a fuel valve, a rotatable valve-operating member connected to said fuel valve, spring means biasing said valve-operating member toward valve-closing position, and an accelerator pedal linkage actuated by the vehicle accelerator pedal, a first rod operatively-connected to said valve-operating member, a second rod connected to said accelerator pedal linkage, means secured to one of said rods slidably receiving the other rod, a locking solenoid mounted on said means and having a plunger normally lockingly engaging said other rod, said solenoid being de-energized under normal operating conditions of the motor vehicle, and circuit means connecting one terminal of the solenoid to said stop-light energizing wire, the other terminal of the solenoid being grounded, whereby said solenoid is electrically connected in parallel with the stop-light energizing wire and becomes energized when the stop-light switch is closed, retracting said plunger and releasing said other rod, and whereby said valve-operating member becomes disconnected from said accelerator pedal linkage, allowing said spring means to move said valve-operating member toward valve-closing position.

2. In combination, a motor vehicle having a stop-light switch closed responsive to the application of the vehicle brakes, said vehicle being provided with a fuel valve biased toward closed position, and means to open said fuel valve including a link rod assembly connected to said fuel valve, said assembly comprising a first rod element, a block secured to said first rod element, a second rod element extending substantially parallel to said first rod element and slidably received in said block, a solenoid mounted on the block and having a plunger normally lockingly engaging said second rod element, said solenoid being de-energized under normal operating conditions of the motor vehicle, said plunger disengaging from said second rod element when the solenoid is energized, and means to energize said solenoid responsive to the closure of said stop-light switch.

3. In combination, a motor vehicle having a stop-light switch closed responsive to the application of the vehicle brakes, said vehicle being provided with a fuel valve biased toward closed position, and means to open said fuel valve including a link rod assembly connected to said fuel valve, said assembly comprising a first rod element, a block secured to said first rod element, a second rod element extending substantially parallel to said first rod element and slidably received in said block, a solenoid mounted on the block and having a plunger extending substantially perpendicular to said second rod element, said solenoid being de-energized under normal operating conditions of the motor vehicle, spring means biasing said plunger into locking engagement with said second rod element, said plunger disengaging from said second rod element when the solenoid is energized, and means to energize said solenoid responsive to the closure of said stop-light switch.

4. In combination, a motor vehicle having a stop-light switch closed responsive to the application of the vehicle brakes, said vehicle being provided with a fuel valve biased toward closed position, and means to open said fuel valve including a link rod assembly connected to said fuel valve, said assembly comprising a first rod element, a block secured to an end portion of said first rod element, a second rod element extending substantially parallel to said first rod element and slidably received in said block, said second rod element being formed with a locking recess, a solenoid mounted on the block and having a plunger extending substantially parallel to said second rod element, said solenoid being de-energized under normal operating conditions of the motor vehicle, said plunger being lockingly engageable in said recess, spring means biasing said plunger toward locking engagement with said recess, said plunger disengaging from said recess when the solenoid is energized, and means to energize said solenoid responsive to the closure of said stop-light switch.

References Cited

UNITED STATES PATENTS

| 1,365,242 | 1/1921 | Heacock | 192—1 |
| 2,765,058 | 10/1956 | Struthers | 192—3 |
| 2,876,875 | 3/1959 | Shaw | 192—3 |
| 3,077,239 | 2/1963 | Simas | 180—82.1 |
| 3,164,220 | 1/1965 | Wurgler | 192—3 X |

KENNETH H. BETTS, *Primary Examiner.*